United States Patent
Ravindranath et al.

(12) 
(10) Patent No.: US 10,474,371 B1
(45) Date of Patent: Nov. 12, 2019

(54) METHOD AND APPARATUS FOR SSD/FLASH DEVICE REPLACEMENT POLICY

(71) Applicant: EMC Corporation, Hopkinton, MA (US)

(72) Inventors: Anil Ravindranath, Sunnyvale, CA (US); Krishna Gudipati, Santa Clara, CA (US)

(73) Assignee: EMC IP Holding Company LLC, Hopkington, MA (US)

( * ) Notice: Subject to any disclaimer, the term of this patent is extended or adjusted under 35 U.S.C. 154(b) by 0 days.

(21) Appl. No.: 15/198,223

(22) Filed: Jun. 30, 2016

(51) Int. Cl.
*G06F 12/00* (2006.01)
*G06F 3/06* (2006.01)
*G06F 12/121* (2016.01)
*G06F 13/00* (2006.01)
*G06F 13/28* (2006.01)

(52) U.S. Cl.
CPC .......... *G06F 3/0616* (2013.01); *G06F 3/0641* (2013.01); *G06F 3/0653* (2013.01); *G06F 3/0688* (2013.01); *G06F 12/121* (2013.01); *G06F 2212/69* (2013.01)

(58) Field of Classification Search
CPC .... G06F 3/0616; G06F 3/0688; G06F 3/0653; G06F 12/121; G06F 3/0641; G06F 2212/69
See application file for complete search history.

(56) References Cited

U.S. PATENT DOCUMENTS

| | | | |
|---|---|---|---|
| 9,652,160 B1* | 5/2017 | Piszczek | G06F 3/0616 |
| 2013/0179631 A1* | 7/2013 | Cepulis | G06F 3/0616 711/103 |
| 2014/0068153 A1* | 3/2014 | Gu | G06F 3/0604 711/103 |
| 2014/0201576 A1* | 7/2014 | Wu | G06F 11/3058 714/47.2 |
| 2015/0269020 A1* | 9/2015 | Nakashima | G06F 11/3037 714/6.22 |

* cited by examiner

*Primary Examiner* — Mark A Giardino, Jr.
(74) *Attorney, Agent, or Firm* — Womble Bond Dickinson (US) LLP

(57) ABSTRACT

One embodiment is related to a method for implementing a staggered solid-state drive (SSD) replacement schedule, comprising: determining whether more than a first threshold number of SSDs within an array are expected to reach End of Life (EOL) at approximately a same time; determining that the staggered SSD replacement schedule is to be engaged in response to determining that more than the first threshold number of SSDs within the array are expected to reach EOL at approximately the same time; determining the staggered SSD replacement schedule for the SSDs that are expected to reach EOL at approximately the same time; and raising replacement alerts according to the determined staggered SSD replacement schedule to prompt a user to replace the SSDs.

18 Claims, 4 Drawing Sheets

METHOD AND APPARATUS FOR SSD/FLASH DEVICE REPLACEMENT POLICY

FIELD OF THE INVENTION

The disclosure relates generally to data storage systems and more particularly to replacing end-of-life solid-state drives.

BACKGROUND

With frequent writes, solid-state drives (SSDs) including flash drives may have a quicker End of Life (EOL) due to limited endurance compared to hard disk drives (HDDs). Once an SSD reaches EOL it can no longer accept requests from the host and needs to be replaced.

Because SSDs are typically faster than HDDs, SSDs are found in some data storage systems as caching devices. A number of SSDs may be installed in a disk array enclosure to form an array that can be used as a cache tier or a hot add tier to improve the performance of the data storage system.

There is a likelihood that all or a majority of SSDs within a cache tier array may reach their EOL at approximately the same time, especially when they were installed at the same time and the write loads have been similar. When this happens, the overall performance of the data storage system may suffer, because no more SSD space is available for caching, until the SSDs that have reached EOL have been replaced.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
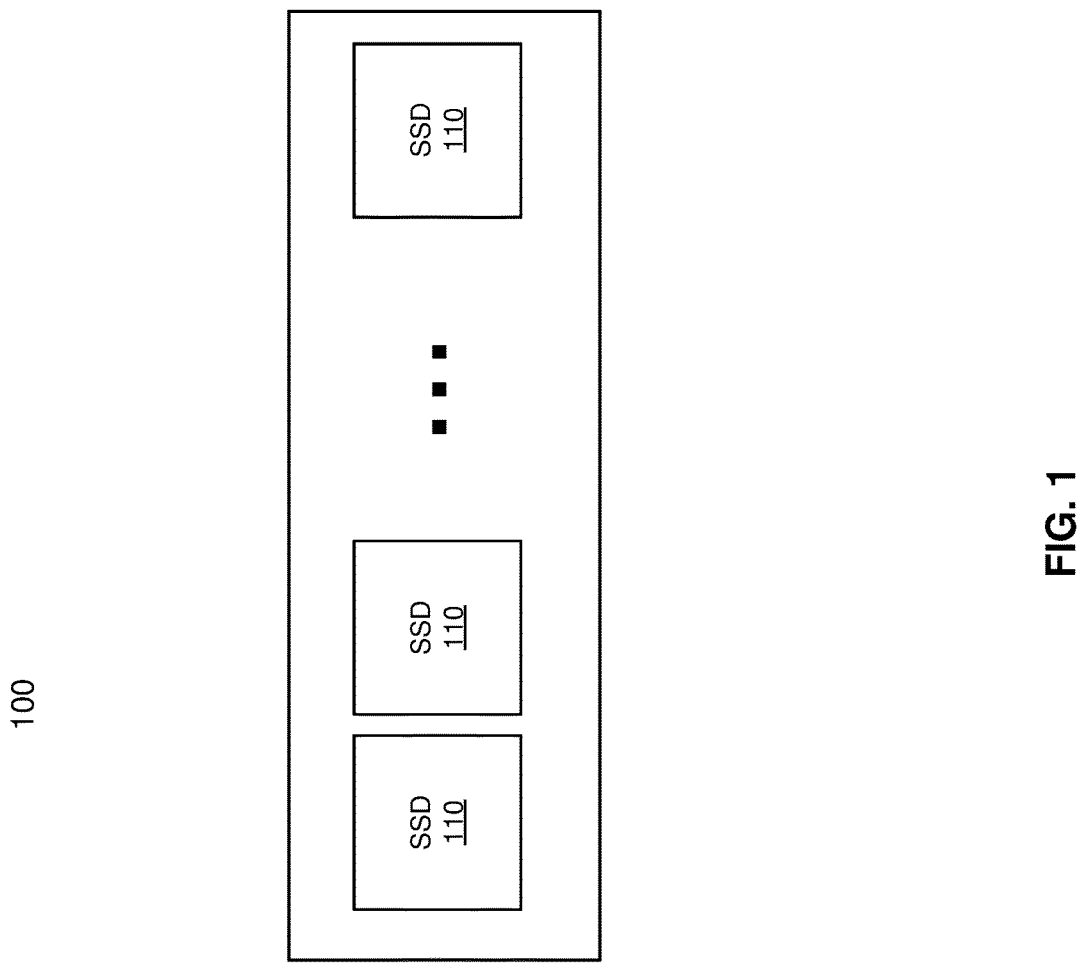
FIG. 1 is a diagram illustrating an example disk array enclosure comprising a plurality of SSDs according to one embodiment of the invention.

Referring to FIG. 1, a diagram illustrating an example disk array enclosure 100 comprising a plurality of SSDs according to one embodiment of the invention is shown. The plurality of SSDs 110 are installed in the disk array enclosure 100. They form an array and act as a caching device of a data storage system, such as the data processing system 400 of FIG. 4.

The wear status indicating the used or remaining life index of an SSD may be obtained by the data storage system from Self-Monitoring, Analysis and Reporting Technology (SMART) data. Hereinafter the wear status of an SSD may be represented in the used life index of the SSD on a 100-point scale. For example, a 0-point wear status indicates the SSD is new, and a 100-point wear status indicates the SSD has reached EOL. However, a person of ordinary skill in the art should realize that the exact wear status representation used is immaterial and does not limit the disclosure. For example, the wear status may also be represented in the remaining life index on a 100-point scale (i.e., a 100-point status indicates the SSD is new, and a 0-point status indicates the SSD has reached EOL). Moreover, the 100-point numerical scale used does not limit the disclosure, either. Other numerical scales, such as a 5-point scale, a 10-point scale, a 1000-point scale, etc., can also be used. Conversion between different representations of the wear status is trivial and known to a person skilled in the art. No matter the representation used, the wear status of an SSD indicates the used life and remaining life of the SSD.

Conventionally, an alert is raised when an SSD has reached EOL to prompt the user to replace the SSD. There is a likelihood that all or a majority of SSDs within a cache tier array may reach their EOL at approximately the same time, especially when they were installed at the same time and the write loads have been similar. When this happens, the overall performance of the data storage system may suffer, because no more SSD space is available for caching, until the SSDs that have reached EOL have been replaced.

Embodiments of the disclosure relate to a method, apparatus, and system for prompting the user to replace multiple SSDs that are expected to reach EOL at approximately the same time in a staggered schedule by advancing the time of SSD replacement for at least some of the affected SSDs in order to avoid the undesired situation where all or a majority of SSDs within a cache tier array reach EOL at the same time.

Figure 2:
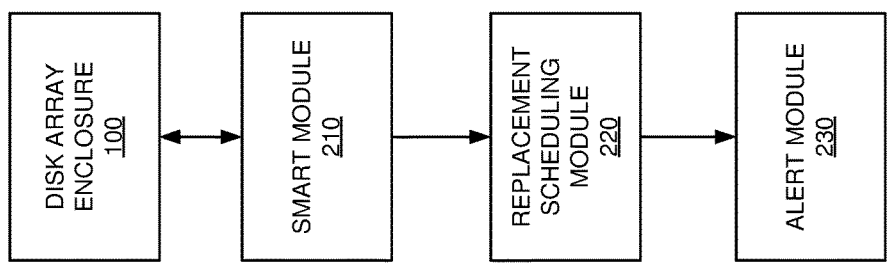
FIG. 2 is a block diagram illustrating example modules for implementing the method, apparatus, and system according to one embodiment of the invention.

Referring to FIG. 2, a block diagram 200 illustrating example modules for implementing the method, apparatus, and system according to one embodiment of the invention is shown. A SMART module 210 may retrieve SMART data including the wear status for all SSDs 110 within the disk array enclosure 100 and transmit the wear status of the SSDs 100 to the replacement scheduling module 220. The replacement scheduling module 220 may determine the SSD replacement schedule based on the wear status of the SSDs 110. If necessary, the replacement scheduling module 220 may determine a staggered SSD replacement schedule to avoid the undesired situation where all or a majority of SSDs 110 reach EOL at the same time. An alert module 230 raises an alert when it comes time to replace an SSD 110 according to the determined SSD replacement schedule to prompt the user to replace the SSD 110. The SMART module 210, replacement scheduling module 220, and alert module 230 may be implemented as hardware or a combination of hardware, such as processor 1501 of FIG. 4, and software, which may reside in memory 1503 and storage device 1508 of FIG. 4.

Figure 3:
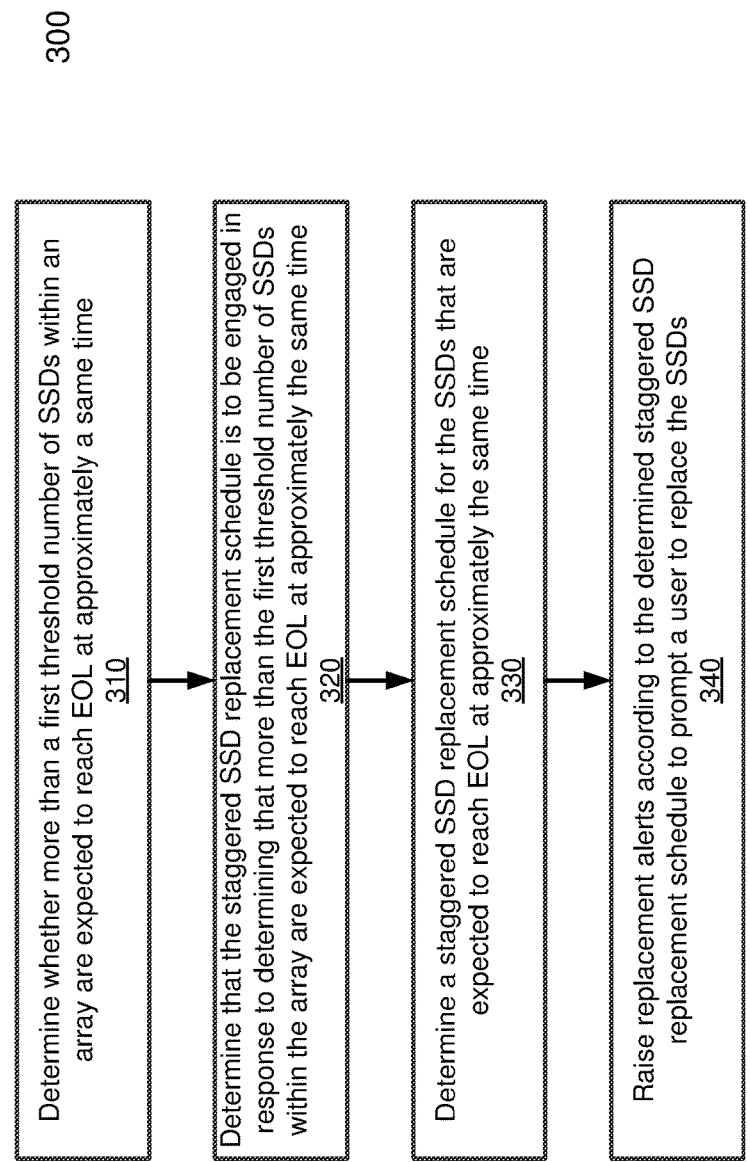
FIG. 3 is a flowchart illustrating an example method for determining a staggered SSD replacement schedule according to one embodiment of the invention.

Referring to FIG. 3, a flowchart illustrating an example method 300 for implementing a staggered SSD replacement schedule according to one embodiment of the invention is shown. At block 310, it may be determined whether more than a first threshold number of SSDs within an array are expected to reach EOL at approximately the same time. The first threshold indicates the maximum number of SSDs that are allowed to reach EOL at the same time without engaging a staggered replacement schedule, and may be dependent on the number of SSDs there are in the array. Therefore, the first threshold may be at least half of the number of SSDs there are in the array. Further, the first threshold may be decreased to more aggressively engage the staggered replacement schedule, and may be increased to less aggressively engage the staggered replacement schedule. For example, in a 4-SSD array the first threshold may be 2 or 3; in a 6-SSD array the first threshold may be 3, 4, or 5, etc. Whether a particular plurality of SSDs are expected to reach EOL at approximately the same time may be determined based on 1) whether all the plurality of SSDs concerned have wear statuses indicating used life indices above a second threshold, and 2) whether the wear statuses for all the plurality of SSDs concerned are indicating used life indices within a sufficiently narrow range represented by a third threshold. For example, the second threshold may be 80, and the third threshold may be 5. Therefore, in this example, if all SSDs concerned have wear statuses indicating used life indices above 80, and the used life indices for all SSDs concerned are within a 5-point range (i.e., the highest used life index and the lowest used life index within the SSDs concerned differ by less than or equal to 5 points), it may be determined that these SSDs concerned are expected to reach EOL at approximately the same time. Of course, the second and third thresholds may be adjusted to tighten or loosen the determination criteria, as desired, without deviating from the disclosure.

At block 320, it may be determined that a staggered replacement schedule is to be engaged in response to determining at block 310 that more than the first threshold number of SSDs within the array are expected to reach EOL at approximately the same time. At block 330, a staggered SSD replacement schedule may be determined for the SSDs that are expected to reach EOL at approximately the same time, as determined at block 310. The staggered replacement schedule may advance the replacement time for at least some of the SSDs before they reach EOL. For example, if two SSDs are to be replaced with a staggered replacement schedule, one may be replaced when its used life index is at 97, and the other at EOL (i.e., when its used life index is at 100). In one embodiment, the one SSD of the two whose used life index reaches 97 first is replaced first when its used life index is at 97, and the other of the two is replaced when its life index reaches EOL. Similarly, in another example, if two SSDs are to be replaced with a staggered replacement schedule, one may be replaced when its used life index is at 90, and the other when its used life index is at 95. In yet another example, if three SSDs are to be replaced with a staggered replacement schedule, one may be replaced when its used life index is at 95, the second one when its used life index is at 97, and the third one at EOL (i.e., when its used life index is at 100). In yet another example, if three SSDs are to be replaced with a staggered replacement schedule, one may be replaced when its used life index is at 85, the second one when its used life index is at 90, and the third one when its used life index is at 95. In yet another example, if four SSDs are to be replaced with a staggered replacement schedule, first two may be replaced when both their used life indices are at 97, and the other two at EOL (i.e., when their used life indices are at 100) (e.g., the first two SSDs whose used life indices reach 97 first are replaced when their used life indices are at 97, respectively, and the other two are replaced when their used life indices reach EOL, respectively). In yet another example, if four SSDs are to be replaced with a staggered replacement schedule, one may be replaced when its used life index is at 85, the second one when its used life index is at 90, the third one when its used life index is at 95, and the fourth one at EOL (i.e., when its used life index is at 100). Therefore, it should be appreciated that great variations may be made to the staggered replacement schedule without deviating from the disclosure. In any event, with a staggered replacement schedule, at least some of the SSDs are replaced before they reach EOL, so that the undesired situation where all or a majority of SSDs within an array reach EOL at the same time may be avoided.

At block 340, replacement alerts may be raised according to the determined SSD staggered replacement schedule to prompt a user to replace the SSDs.

Method 300 may be performed by processing logic that includes hardware (e.g. circuitry, dedicated logic, etc.), software (e.g., embodied on a non-transitory computer readable medium), or a combination thereof. For example, method 300 may be performed by processor 1501 of FIG. 4. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
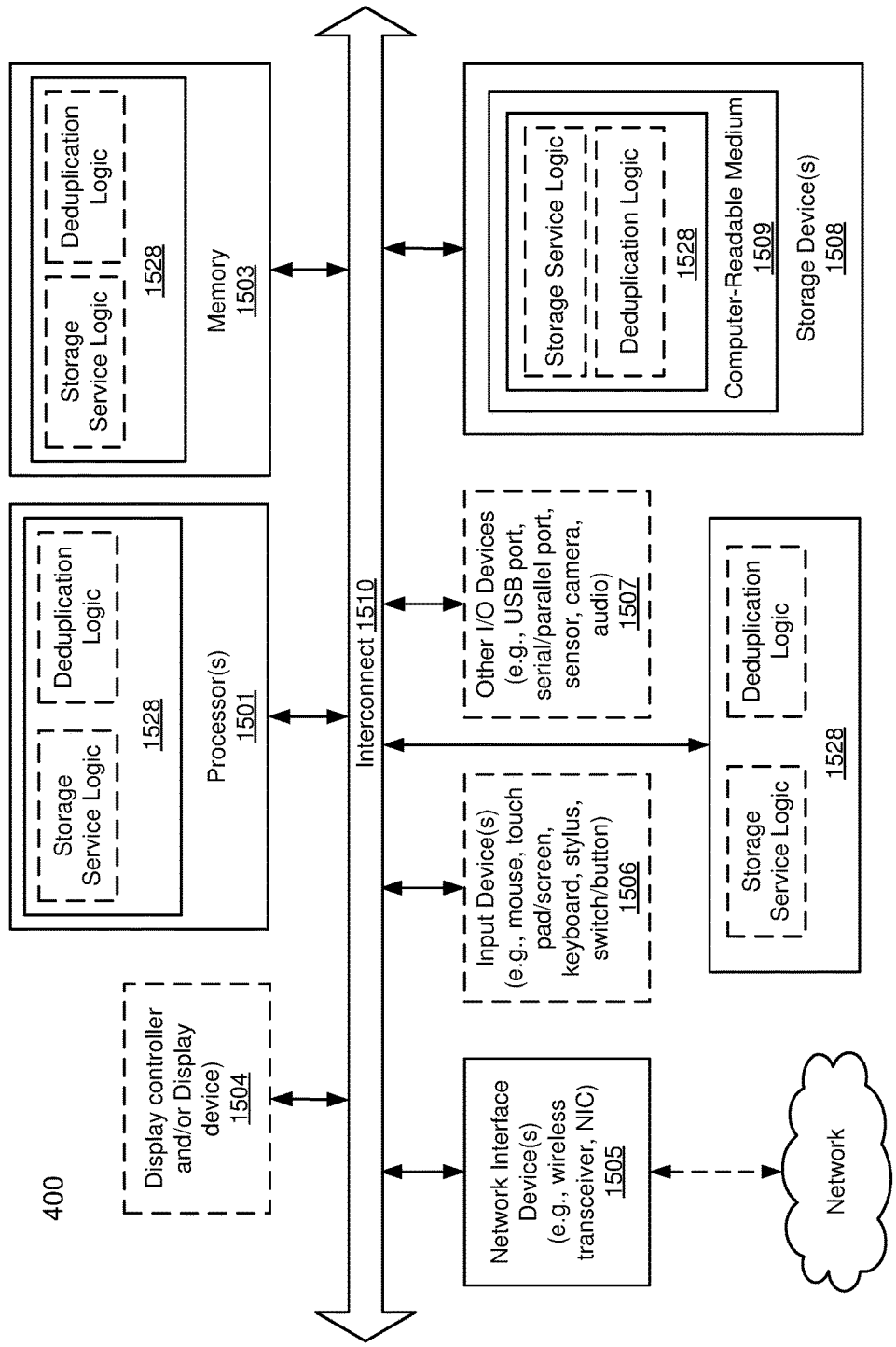
FIG. 4 is a block diagram illustrating an example data processing system according to one embodiment of the invention.

FIG. 4 is a block diagram illustrating an example data processing system 400 according to one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

One embodiment of the disclosure is related to a data processing system, comprising: a processor; and a memory coupled to the processor storing instructions which, when executed by the processor, cause the processor to perform maintenance operations, the operations including: determining whether more than a first threshold number of solid-state drives (SSDs) within an array are expected to reach End of Life (EOL) at approximately a same time; determining that a staggered SSD replacement schedule is to be engaged in response to determining that more than the first threshold number of SSDs within the array are expected to reach EOL at approximately the same time; determining the staggered SSD replacement schedule for the SSDs that are expected to reach EOL at approximately the same time; and raising replacement alerts according to the determined staggered SSD replacement schedule to prompt a user to replace the SSDs.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for implementing a staggered solid-state drive (SSD) replacement schedule, comprising:
    determining whether more than a first threshold number of SSDs within an array are expected to reach End of Life (EOL) at approximately a same time;
    determining whether all of the more than the first threshold number of SSDs expected to reach EOL at approximately the same time have wear statuses indicating used life indices above a second threshold;
    determining whether the indicated used life indices above the second threshold fall within a range represented by a third threshold, such that the indicated used life indices above the second threshold fall within the range when a highest used life index and a lowest used life index, included within the indicated used life indices above the second threshold, differ by less than or equal to the third threshold;
    determining that the staggered SSD replacement schedule is to be engaged in response to determining that the more than the first threshold number of SSDs expected to reach EOL at approximately the same time have indicated used life indices that are above the second threshold and fall within the range represented by the third threshold;
    determining the staggered SSD replacement schedule for the SSDs for which the staggered SSD replacement schedule is engaged; and
    raising replacement alerts according to the determined staggered SSD replacement schedule to prompt a user to replace the SSDs for which the staggered SSD replacement schedule is engaged, wherein the alerts raised advances a replacement schedule time for at least one of the SSDs within the array to avoid the undesired situation where all or a majority of SSDs within the array reach EOL at approximately the same time.

2. The method of claim 1, wherein the wear statuses of the plurality of SSDs are obtained from Self-Monitoring, Analysis and Reporting Technology (SMART) data.

3. The method of claim 1, wherein the array is a cache tier array.

4. The method of claim 1, wherein the first threshold is at least half of a number of SSDs in the array.

5. The method of claim 1, wherein the staggered SSD replacement schedule advances replacement of at least some of the SSDs before they reach EOL.

6. The method of claim 5, wherein a situation where all or a majority of SSDs within the array reach EOL at the same time is avoided.

7. A non-transitory machine-readable medium having instructions stored therein which, when executed by a processor, cause the processor to perform maintenance operations, the operations comprising:
   determining whether more than a first threshold number of solid-state drives (SSDs) within an array are expected to reach End of Life (EOL) at approximately a same time;
   determining whether all of the more than the first threshold number of SSDs expected to reach EOL at approximately the same time have wear statuses indicating used life indices above a second threshold;
   determining whether the indicated used life indices above the second threshold fall within a range represented by a third threshold, such that the indicated used life indices above the second threshold fall within the range when a highest used life index and a lowest used life index, included within the indicated used life indices above the second threshold, differ by less than or equal to the third threshold;
   determining that a staggered SSD replacement schedule is to be engaged in response to determining that the more than the first threshold number of SSDs expected to reach EOL at approximately the same time have indicated used life indices that are above the second threshold and fall within the range represented by the third threshold;
   determining the staggered SSD replacement schedule for the SSDs for which the staggered SSD replacement schedule is engaged; and
   raising replacement alerts according to the determined staggered SSD replacement schedule to prompt a user to replace the SSDs for which the staggered SSD replacement schedule is engaged, wherein the alerts raised advances a replacement schedule time for at least one of the SSDs within the array to avoid the undesired situation where all or a majority of SSDs within the array reach EOL at approximately the same time.

8. The non-transitory machine-readable medium of claim 7, wherein the wear statuses of the plurality of SSDs are obtained from Self-Monitoring, Analysis and Reporting Technology (SMART) data.

9. The non-transitory machine-readable medium of claim 7, wherein the array is a cache tier array.

10. The non-transitory machine-readable medium of claim 7, wherein the first threshold is at least half of a number of SSDs in the array.

11. The non-transitory machine-readable medium of claim 7, wherein the staggered SSD replacement schedule advances replacement of at least some of the SSDs before they reach EOL.

12. The non-transitory machine-readable medium of claim 11, wherein a situation where all or a majority of SSDs within the array reach EOL at the same time is avoided.

13. A data processing system, comprising:
   a processor; and
   a memory coupled to the processor storing instructions which, when executed by the processor, cause the processor to perform maintenance operations, the operations including:
   determining whether more than a first threshold number of solid-state drives (SSDs) within an array are expected to reach End of Life (EOL) at approximately a same time;
   determining whether all of the more than the first threshold number of SSDs expected to reach EOL at approximately the same time have wear statuses indicating used life indices above a second threshold;
   determining whether the indicated used life indices above the second threshold fall within a range represented by a third threshold, such that the indicated used life indices above the second threshold fall within the range when a highest used life index and a lowest used life index, included within the indicated used life indices above the second threshold, differ by less than or equal to the third threshold;
   determining that the staggered SSD replacement schedule is to be engaged in response to determining that the more than the first threshold number of SSDs expected to reach EOL at approximately the same time have indicated used life indices that are above the second threshold and fall within the range represented by the third threshold;
   determining the staggered SSD replacement schedule for the SSDs for which the staggered SSD replacement schedule is engaged; and
   raising replacement alerts according to the determined staggered SSD replacement schedule to prompt a user to replace the SSDs for which the staggered SSD replacement schedule is engaged, wherein the alerts raised advances a replacement schedule time for at least one of the SSDs within the array to avoid the undesired situation where all or a majority of SSDs within the array reach EOL at approximately the same time.

14. The data processing system of claim 13, wherein the wear statuses of the plurality of SSDs are obtained from Self-Monitoring, Analysis and Reporting Technology (SMART) data.

15. The data processing system of claim 13, wherein the array is a cache tier array.

16. The data processing system of claim 13, wherein the first threshold is at least half of a number of SSDs in the array.

17. The data processing system of claim 13, wherein the staggered SSD replacement schedule advances replacement of at least some of the SSDs before they reach EOL.

18. The data processing system of claim 17, wherein a situation where all or a majority of SSDs within the array reach EOL at the same time is avoided.

* * * * *